United States Patent
Carter

[11] 3,913,975
[45] *Oct. 21, 1975

[54] SUSPENSION SEAT

[75] Inventor: John W. Carter, Davenport, Iowa

[73] Assignee: Seats, Incorporated, Reedsburg, Wis.

[*] Notice: The portion of the term of this patent subsequent to Jan. 16, 1990, has been disclaimed.

[22] Filed: July 23, 1973

[21] Appl. No.: 381,922

Related U.S. Application Data

[63] Continuation-in-part of Ser. No. 220,803, Jan. 26, 1972, which is a continuation-in-part of Ser. No. 47,762, June 19, 1970.

[52] U.S. Cl. ............... 297/307; 297/316; 248/399
[51] Int. Cl.² ............................................. B60N 1/00
[58] Field of Search ........... 297/307, 301, 309, 304, 297/316, 323; 248/399, 400

[56] References Cited
UNITED STATES PATENTS

| | | | |
|---|---|---|---|
| 2,341,124 | 2/1944 | Sheldrick | 297/301 |
| 3,335,996 | 8/1967 | Hall | 248/400 |
| 3,356,413 | 12/1967 | Radke | 248/399 X |
| 3,711,149 | 1/1973 | Carter | 297/316 |

FOREIGN PATENTS OR APPLICATIONS

| | | | |
|---|---|---|---|
| 831,304 | 5/1938 | France | 297/307 |
| 756,534 | 9/1933 | France | 297/302 |
| 143,957 | 2/1931 | Switzerland | 297/302 |

*Primary Examiner*—Francis K. Zugel
*Attorney, Agent, or Firm*—Molinare, Allegretti, Newitt & Witcoff

[57] ABSTRACT

The improved vehicle suspension seat described has a novel parallelogram linkage which extends between the back and bottom cushions of the seat and a seat support mounted on the vehicle and which is arranged and constructed so that during operation of the vehicle, the feeling of pinching, between the back and bottom cushions during downward movement of the seat, experienced by a person sitting on the seat is minimized and also the scrubbing action, caused by fore-aft motion of the bottom cushion under the legs of the person sitting on the seat, is minimized.

17 Claims, 13 Drawing Figures

Inventor:
John W. Carter
By Molinare, Allegretti,
Newitt & Witcoff
Attys.

SUSPENSION SEAT

This is a continuation-in-part application to my application, Ser. No. 220,803 filed Jan. 26, 1972 which is, in turn, a continuation-in-part to my application, Ser. No. 47,762 filed June 19, 1970.

BACKGROUND OF THE INVENTION

The present invention relates to an improved vehicle suspension seat, and more particularly, to relatively inexpensive, improved suspension seat for off-the-road vehicles, such as earth-moving tractor scrapers, trucks, tractors, construction equipment, agricultural equipment and the like, which are at least, on occasion, subjected to fairly severe bouncing and vibrations during operation.

It has been recognized that over a period of time, the performance and physical well-being of vehicle operators are adversely affected by the constant bouncing and vibration normally encountered during the operation of off-the-road vehicles, In the past, various types of suspension seats have been proposed to attempt to isolate the vehicle operator's seat from the vehicle vibrations and thus to improve the quality of the ride provided for the vehicle operator. Some of these proposed suspension seats have utilized various types of parallelogram linkages including parallelogram linkages which suspend the seat from the vehicle so that the seat pivots up and down adjacent to its front end and so that there is a pivotable connection between the links supporting the back cushion and the links supporting the bottom cushion of the seat. A suspension seat utilizing this latter type of parallelogram linkage is shown in the French patent No. 831,304, issued to Henri Didier on May 30, 1938. Previously, suspension seats have also utilized air springs to provide a smoother ride and on occasions, the air springs have included means to permit the vehicle operator to adjust the height of the seat. Shock absorbers have been used to dampen the vibrations acting on the seat and in some seats, the damping force exerted by the shock absorber may be varied. However, most of the present commercially available suspension seats, which may be satisfactorily used for off-the-road vehicles, include relatively complicated mechanisms and linkages and are relatively expensive.

The improved suspension seat of the present invention is different from prior, commercially available seats in that it utilizes a novel parallelogram linkage which cooperates, in a novel manner, with the bottom cushion and the back cushion of the seat to satisfactorily isolate the vehicle operator from vehicle vibrations, and to permit the seat to move in a manner which approximates "natural body action" of the vehicle operator so as to provide an overall smoother ride. The use of the novel parallelogram linkage not only provides a relatively smooth, high quality ride for the vehicle operator, but also permits the seat to be manufactured at a relatively low cost.

In the improved suspension seat of the prevent invention, the seat pivots up and down about the front edge of the upper, body contacting surface of the bottom cushion, which edge is substantially where the vehicle operator's knee joints are located when he is seated normally on the seat. Since the upper, front edge of the bottom cushion of the seat remains relatively stationary during the operation of the vehicle, vertical movement of the remainder of the seat does not tend to lift the operator's feet off the foot pedals of the vehicle. This also permits the rear end of the seat, i.e., the portion of the seat where the vehicle operator's weight is concentrated, to accept relatively large, shock absorbing, vertical movements without adversely affecting the quality of the ride provided by the seat.

The novel parallelogram linkage of the present invention is constructed and arranged so that during downward movement of the seat, the back cushion moves downwardly along a predetermined, curvilinear path about the upper front edge of the bottom cushion and augularly, with respect to the bottom cushion whereby the decrease in the included angle between the back and bottom cushions is minimized so that the feeling of pinching, between the back and bottom cushions, experienced by the vehicle operator sitting in the seat is minimized. As noted above, the parallelogram linkage is also constructed and arranged so as to provide a high quality ride in that the pivotal connection between the bottom cushion pan and the seat support is located adjacent to the front edge of the upper, body contacting surface of the bottom cushion thereby minimizing the feeling of scrubbing, caused by fore-aft motion of the upper surface of the bottom cushion, experienced by the operator sitting on the seat during the operation of the vehicle and in that the pivotal connection between the back and bottom cushions is located adjacent to the hip joint of the operator sitting in the seat, i.e., to the intersection of the plane of the upper, body contacting surface of the bottom cushion and the plane of the upper, body contacting surface of the back cushion.

The improved suspension seat of the present invention also includes a shock absorber to dampen oscillatory motion of the parallelogram linkage and thus of the seat. The damping force which the shock absorber exerts on the linkage may be manually varied by the vehicle operator when he is seated in the seat. In other words, the vehicle operator is able to select the damping action or the "firmness" of the seat which is his personal preference. This is an important feature from the standpoint of the commercial exploitation of the seat since it affords the vehicle operator with the psychologically satisfying feeling that he has some control of the quality of his ride.

A relatively low rate fluid spring is also utilized with the improved suspension seat of the present invention to isolate the vehicle operator from the typical 1.5 to 2.5 cycle per second "bouncing" or "pitching" motions which are characteristic of off-the-road vehicles, such as tractor scrapers, and thus to provide a "soft" ride. The fluid spring also includes means to permit the vehicle operator to adjust the height of the bottom cushion and also the included angle between the bottom and back cushions to his personal preference while he is seated in the seat.

In some of the preferred embodiments of the improved seat disclosed herein, the seat support includes a vertical portion located adjacent to the front of the seat. A first pair of links are positioned below and parallel to the bottom cushion pan, which in addition to supporting the bottom cushion, functions as part of the parallelogram linkage, and is pivotally connected at a point on its front end, midway between the sides of the pan, to the vertical portion of the seat support. Preferably the pivotal connection between the bottom cushion pan and the seat support is located within one and one-half inches from the upper surface of the bottom cushion so as to minimize the scrubbing action of the seat on the operator sitting on the seat. The first pair of links are both pivotally connected at their front ends to the vertical portion of the seat support. A second pair of links are pivotally connected at their one ends to the rear ends of the first pair of links and intermediate their ends, to the rear end of the bottom cushion pan. The other ends of the second pair of links support the back cushion pan which carries the back cushion. The pivotal connections between the bottom cushion pan and the second pair of links are located adjacent to the intersection of the plane of the upper, body contacting surface of the bottom cushion and the plane of the upper, body contacting surface of the back cushion. Also, the length of the first pair of links is preferably at least fourteen-seventeenths of the distance between the front and rear ends of the bottom cushion pan so that as the seat moves downwardly the decrease in the included angle between the bottom and back cushions is minimized thereby reducing the feeling of pinching experienced by the vehicle operator between the back and bottom cushions.

In other disclosed embodiments of the present invention, the front end of the bottom cushion pan is not pivotally connected to the vertical portion of the seat support (although the parallelogram linkage is arranged so that the seat still pivots about the front edge of the upper surface of the bottom cushion) and the parallelogram linkage includes additional links, and in some embodiments, rollers and roller guides, to ensure that bottom cushion pivots up and down about its upper front edge. In another embodiment, the first pair of links is replaced by rollers which are mounted adjacent to the pivotal connection between the second pair of links and the bottom cushion pan and which are disposed in vertical roller guides for guided movement therein. In still another embodiment, the length of the first pair of links and the bottom cushion pan are equal while the minimization of the "pinching" is achieved by arranging the parallelogram linkage such that the distance between the connection of the second pair of links and the bottom cushion pan and the connection of the first and second pairs of links are greater than the distance between the connection of the bottom cushion pan and the seat support and the connection of the first pair of links and the seat support. In a still further embodiment, the minimization of the "pinching" is achieved by arranging the parallelogram linkage such that the length of the bottom cushion pan is slightly greater than the length of the first pair of links and the distance between the point of connection of the second pair of links and the bottom cushion pan is slightly greater than the distance between the point of connection of the first pair of links and the seat support and the point of connection of the cushion pan and the seat support.

Accordingly, it is a primary object of the present invention to provide an improved suspension seat which affords a satisfactory quality of ride, from the standpoint of commercial acceptance, and which can be manufactured at a relatively low cost.

Another object of the present invention is to provide an improved suspension seat of the type described wherein a novel parallelogram linkage is arranged and constructed so that the decrease in the included angle between the back cushion and the bottom cushion is minimized when the seat is moved downwardly, so that the bottom cushion of the seat pivots up and down about the front edge of the upper, body contacting surface of the bottom cushion and so that the back cushion and bottom cushion of the seat may pivot relative to each other about a line located adjacent to the intersection of the plane of the upper, body contacting surface of the bottom cushion and the plane of the upper, body contacting surface of the back cushion.

Still another object of the present invention is to provide an improved suspension seat of the type described wherein the pivotal connection between the front end of the bottom cushion pan and the seat support is located adjacent to the longitudinal centerline of the bottom cushion and is of such a length that it may be disposed between the legs of the operator.

A still further object of the present invention is to provide an improved suspension seat of the type described wherein a relatively low rate fluid spring is used to bias the parallelogram linkage away from the seat support and to isolate the seat from the "bouncing" and "pitching" motions characteristic of off-the-road vehicles and wherein a shock absorber is utilized to dampen the oscillatory motion of the seat. A related object of the present invention is to provide an improved suspension seat of the type described wherein the damping force exerted by the shock absorber on the parallelogram linkage may be varied by the vehicle operator when he is seated in the seat.

These and other objects and features of the present invention will become apparent from the description of the following embodiments of the present invention.

BRIEF DESCRIPTION OF THE DRAWINGS

Referring to the drawings, wherein like reference numerals indicate like parts throughout the figures:

FIG. 14 is a partial, vertical, cross-sectional view of a still further vehicle suspension seat embodying the present invention; and FIG. 15 is a partial, vertical, cross-sectional view of still another vehicle suspension seat embodying the present invention.

DESCRIPTION OF THE PREFERRED EMBODIMENT
FIGURES 1-5 EMBODIMENT

In the embodiment of the present invention shown in FIGS. 1 through 5, an improved suspension seat 21 comprises a support or frame 22 which includes a base portion 23, a vertical wall portion 24 and side walls 25 and 26 which are used for reinforcement. The vertical wall portion 24 is positioned adjacent to the front of the seat, and the bottom portion 23 is adapted to be securely mounted on an off-the-road vehicle which normally encounters vibrations during operation.

A novel parallelogram linkage, shown generally at 27, includes a bottom cushion pan 28, a first pair of identical links 29 and 31 and a second pair of identical links 32 and 33. The bottom cushion pan 28 is generally flat and is designed to support and carry the bottom cushion 34, as well as serve as a part of the linkage 27.

Figure 1:
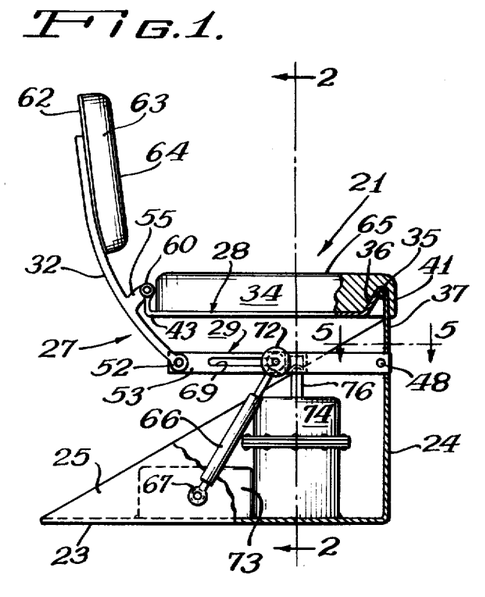
FIG. 1 is a partial, vertical, cross-sectional view of a vehicle suspension seat embodying the present invention.
Figure 2:
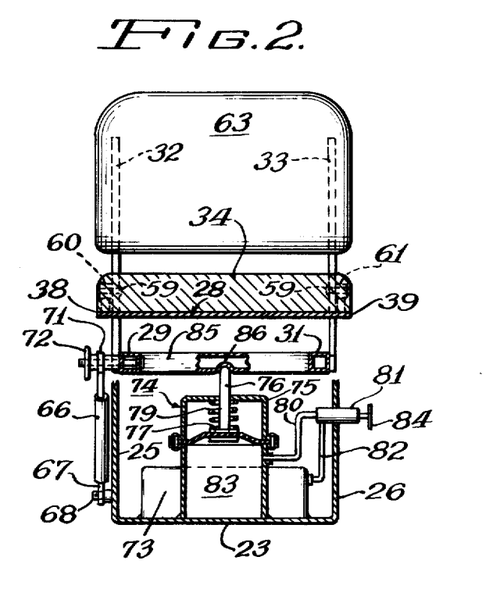
FIG. 2 is a cross-sectional view taken on line 2—2 of FIG. 1.
Figure 3:
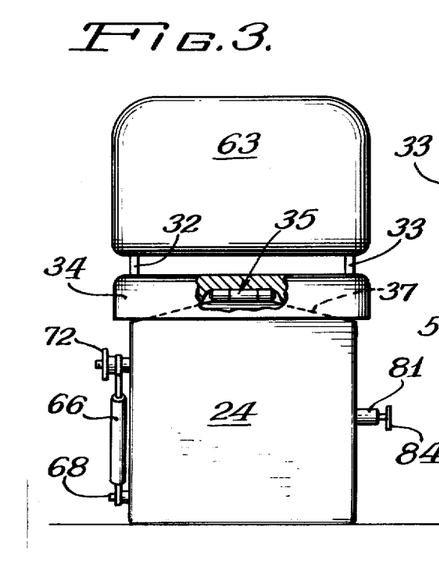
FIG. 3 is a front, plan view of the vehicle suspension seat shown in FIG. 1.

As best shown in FIGS. 1 and 3, a hinge 35 pivotally connects the front end 36 of the pan 28 with the upper end 37 of the vertical portion 24. The hinge 35 is of conventional design and is mounted equidistant adjacent to the longitudinal centerline of the cushion 34 and between the sides 38 and 39 of the pan 28. Thus when the vehicle operator is seated on the seat 21, the hinge 35 will generally be located between the operator's legs. To avoid the possibility of the hinge 35 pinching the legs of the operator, the front end 41 of the bottom cushion 34 covers or overlies the hinge 35 so as to shield the operator's legs from the hinge. It has been found that preferably the transverse length of the hinge 35 (i.e. the length of the hinge 35 in the direction transverse to the longitudinal centerline of the cushion 34) should not exceed six inches and that the hinge 35 should be located withon one and one-half inches from the upper, body contacting surface of the cushion 34.

Locating the hinge 35, as described, permits the pan 28, and thus the seat 21, to move up and down about an axis which is adjacent to the front transverse edge of the upper, body contacting surface of the cushion 34. Since the upper front transverse edge of the cushion 34 is located adjacent to the knee joints of the vehicle operator when the operator is seated in the seat 21, vertical movement of the seat 21 will not cause the operator's feet to be lifted off of the foot pedals of the vehicle during operation of the vehicle. Further, when the hinge 35 is located within one and one-half inches of the upper surface of the cushion 34, the scrubbing action of the cushion 34 on the legs of the operator is minimized. Such scrubbing action is caused by fore-aft motion of the upper surface of the cushion 34 under the operator's legs and this fore-aft motion has been known to cause operator discomfort by virtue of tending to "scoot" him back and forth. Clearly, the longer the "vertical lever arm" between the hinge 35 and the upper surface of the cushion 34, the more fore-aft motion at the upper surface of the cushion 34 under the operator's legs.

Figure 4:
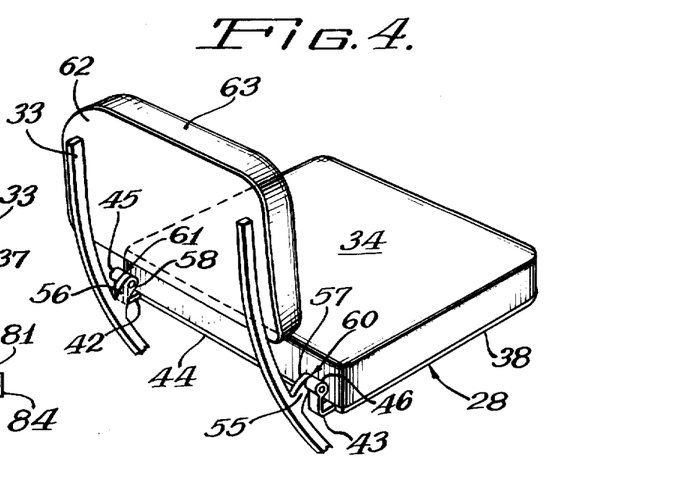
FIG. 4 is a partial, perspective view of the vehicle seat shown in FIG. 1.

As best shown in FIG. 4, a pair of generally L-shaped arms 42 and 43 are secured to the rear end 44 of the pan 28. Bearings 45 and 46 are formed on the ends of the arms 42 and 43, respectively.

Figure 5:
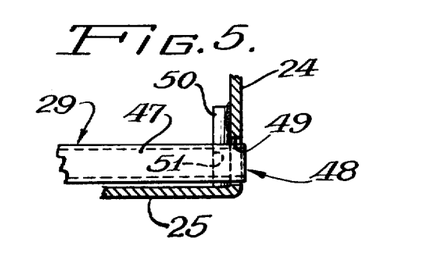
FIG. 5 is an enlarged, cross-sectional view taken on line 5—5 in FIG. 2.

The links 29 and 31 are disposed below the pan 28 and are generally parallel to the pan 28. The front ends 47 of the links are pivotally connected, as indicated at 48, to the vertical wall portion 24 of the seat support 22. More specifically and as shown in FIG. 5, the front end 47 of the link 29 extends through an aperture 49 formed in the wall portion 24 adjacent to the side wall 26. A bar 50 is secured to the inner surface of the wall portion 24 and extends through a transverse aperture 51 in the end 47 of the link 29. The diameters of the bar 50 and the apertures 49 and 51 are selected so that the link 29 may freely pivot about the longitudinal axis of the bar 51. The link 31 is pivotally connected to the wall portion 24 in a manner identical to that of link 29.

Conventional bearings 52 pivotally connect the rear ends 53 of the links 29 and 31 to the ends 54 of the links 32 and 33. Preferably the links 29 and 31 are made of tubular construction so as to provide maximum strength, with minimum weight, since these links 29 and 31 must support and "rigidize" the entire parallelogram linkage 27.

The links 32 and 33 include integral arms 55 and 56, respectively, which are located between the ends of the links. Bearings 57 and 58 are formed on the ends of the arms 55 and 56, respectively. The arms 55 and 56 are constructed and positioned so that the bearings 57 and 58 are positioned adjacent to the bearings 46 and 45, respectively. Pins 59 are positioned in and between the bearings 46 and 56 and in and between the bearings 45 and 58 so that a pivotal connection 60 is formed between the pan 28 and the link 32 by the bearings 46 and 57 and a pivotal connection 61 is formed between the pan 28 and the link 33 by the bearings 45 and 58. The upper ends of the links 32 and 33 are spaced apart from each other. A back cusion pan 62 is secured to and thus supported and carried by the upper ends of the arms 32 and 33. A back cushion 63 is supported and carried by the pan 62.

The cushion 32 and 63 may be of any construction or design. For example, the cusion 43 could be of a "wrap around" design which restricts sideways movement of the operator when he is sitting in the seat. Similarly, if desired, the back cusion 34 could extend downwardly so that its outer surface 64 is closely adjacent to the outer surface 65 of the bottom cushion 34, although preferably as shown, there is a gap between the cushions 63 and 34 so as to provide a cooler ride.

As best shown in FIGS. 1 – 4 the parallelogram linkage is arranged so that when the seat 21 moves downwardly, (about the hinge 35), the back cushion 63 is moved downwardly along a predetermined curvilinear path and angularly, with respect to the bottom cushion 34, whereby the decrease in the included angle between the bottom and back cushions 34 and 63 is minimized so that the feeling of pinching, between the cushions 34 and 63, experienced by the operator in the seat is minimized. More specifically in seat 21, the parallelogram linkage 27 is arranged so that the length of the links 29 and 31, i.e., the distance between the front pivotal connection 48 and the rear pivotal connection 52, is less than the distance between the front end 36 and the rear end 44 of the pan 28, and as noted, this arrangement substantially reduces the tendency of the seat 21 to "pinch" the operator sitting therein as the seat 21 moves downwardly from the position shown in FIG. 1. It has been found that the length of the links 29 and 31 should be at least fourteen-seventeenths, and preferably fifteen-seventeenths, of the distance between the ends 36 and 44 of the pan 28 (with the distance between pivotal connections 35 and 48 and between pivotal connections 60 and 52 being four inches)

and that if the ratio of the length of the links 29 and 31 to the distance between the ends 36 and 444 is decreased (i.e., less than fourteen-seventeenths) then a feeling of "back-slap" is produced which negates the benefits of any further minimization of pinching insofar as the quality of the ride is concerned. Moreover, it has also been found that for the same amount of downward movement (i.e., six inches), when the length of the links 29 and 31 is fifteen inches and the distance between the ends 36 and 44 is seventeen inches, (again with the distance between the pivotal connections 35 and 48 and between pivotal connections 60 and 52 being four inches) the included angle (between the cushions 34 and 63) is increased by three and one-half degrees over what it would have been if the lengths of the links 29 and 31 and distance between the ends 36 and 44 were both seventeen inches, and that this three and one-half degree change was sufficient to eliminate the feeling of "pinching."

The parallelogram linkage 27 is also arranged so that the pivotal connections 60 and 61 are positioned adjacent to the intersection of the plane of the upper surface body contacting 64 of the back cushion 63 and the place of the upper surface body contacting 65 of the bottom cushion 34. It has been found that when the pivotal connections 60 and 61 are so positioned, i.e., positioned close to the hip joint of the operator, an unusually smooth ride is obtained since the seat is then able to follow the "natural body action" movement of the operator seated in the seat.

A conventional shock absorber 66 is utilized with the seat 21 to dampen oscillatory motion of the seat. The lower end 67 of the shock absorber 66 is pivotally connected to a stub shaft 68 mounted in the side wall 25 of the support 22. The longitudinal slot 69 is formed in the link 29 so that the longitudinal axis of the slot is parallel with the longitudinal axis of the link. The upper end 71 of the shock absorber 66 is disposed within the slot 69 so that it may be moved along the slot 69 by the operator when he is seated in the seat. A locking knob 72 is carried by the upper end 71 of the shock absorber 66 and is utilized to selectively prevent the end 71 from moving relative to the slot 69 when the knob 72 is tightened. In other words, the knob 72 is utilized to hold the end 71 of the shock absorber 66 in a particular location within the slot which the operator has selected. By moving the end 71 of the shock absorber 66 with respect to the slot 69, the operator is able to change or vary the angle of the shock abosrber with respect to the link 29 and thus vary or change the mechanical advantage of the shock absorber. In other words, the damping force exerted by the shock absorber 66, on the link 29 and thus on the parallelogram linkage 27 may be changed or varied by the operator moving the end 71 of the shock absorber 66 within the slot 69. The shock absorber 66 may be of the type which can be internally adjusted by the operator so as to increase or decrease the resistance of the shock absorber. This, of course, permits the operator to have a wider "selection" or control over the suspension damping action of the seat 21, and as noted above this has proven to be psychologically advantageous in that the operator then feels he has a definite control over the quality of the ride.

A conventional air reservoir 73 is mounted on the base portion 23 between the side walls 25 and 26. The reservoir 73 serves as a source of air under pressure. A conventional relatively low rate air spring 74 is also mounted on the base portion 23 between the side walls 25 and 26 and between the wall portion 24 and the reservoir 73. The air spring 74 includes a housing 75 having an aperture formed in its upper, end wall through which aa reciprocally movable shaft 76 extends. The lower end 77 of the shaft 76 is connected to a reinforced diaphragm 78 which is clamped about its periphery in the housing 75. The coil compression spring 79 is positioned between the upper end wall of the housing and the diaphragm 78 and biases the diaphragm 78, and thus the shaft 76, downwardly although, if desired, the spring 79 does not have to be utilized. A tube 80, an air control valve 81 and a tube 82 connect the portion 83 of the housing 75, between the diaphragm 78 and the bottom end wall of the housing 75, with the reservoir 73. The valve 81 includes a handle 84 which is positioned so that it may be manually actuated by the operator when he is seated in the seat. The valve 81 is of a conventional design and permits air under pressure from the reservoir 73 to be introduced into the portion 83 of the housing 75 or permits the air in the portion 83 of the housing 75 to be exhausted to the atmosphere. When the valve 82 is closed not flow of air is permitted to or from the portion 83 of the housing 75. The portion 83 of the housing 75 has a relatively large volume so as to provide aa relatively "soft" spring. It should be noted that a coil compression spring cannot, as a practical matter, be utilized in place of the spring 74 because in order to obtain the same "soft" ride and yet be able to accommodate operators of different weights, the spring would have to be longer than the space available. Also it should be noted that an air-oil spring could, of course, be utilized in place of the spring 74 if desired, although an air-oil spring is usually more expensive than an air spring.

A transverse link 85 extends between and is secured to the links 29 and 31 midway between their ends. The link 85 has a centrally located concave recess 86 formed therein and the link 85 is located so that the upper end of the shaft 76 of the air spring 74 is disposed within the recess 86. Thus, through the shaft 76 and the link 85, the spring 74 exerts an upward bias on the links 29 and 31 and thus on the linkage 27. The use of the air spring 74 provides a "soft" ride for the seat in that the spring 74 tends to isolate the operator seated on the seat 21 from the typical 1.5 to 2.5 cycles per second "bouncing" and "pitching" motions characteristic of off-the-road vehicles. In addition, by actuating the valve 81, the operator is able to adjust the height of the bottom cushion 34 with respect to the base portion 23 of the support 22 and also the included angle between the bottom and back cushions. In other words, if the operator wishes to move the cushion 34 upwardly, he actuates the valve 81 so as to permit additional pressurized air from the reservoir 73 to be introduced into the portion 83 of the housing 75. Conversely, if the operator wishes to lower the cushion 34, with respect to the base portion 23, he actuates the valve 81 so that air is exhausted from the portion 83 of the housing 75.

The embodiments of the improved suspension seat of the present invention shown in FIG. 6, 7, 8, 10, 11 and 13 are functionally identical to the seat 21 and are structurally identical to the seat 21 except as hereinafter specifically noted. For the purposes of clarity, the shock absorber 66, the reservoir 73 and the air spring 74, and their associated and cooperating parts, are not included with the seats shown in these FIGURES, although in practice, they would be utilized in the seats shown.

Figure 6:
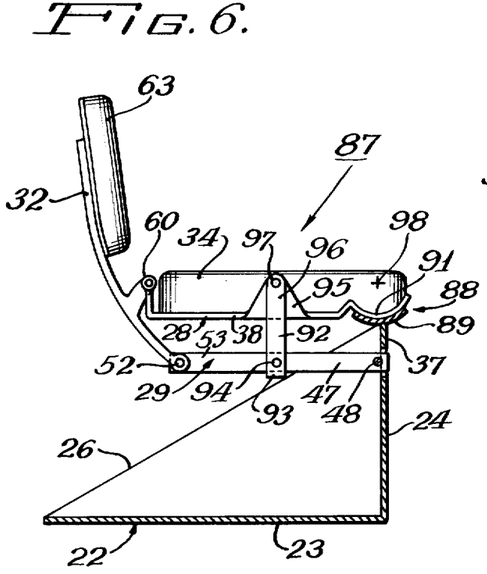
FIGS. 6, 7, and 8 are partial, vertical cross-sectional views of other vehicle suspension seats embodying the present invention.

FIGURE 6 EMBODIMENT

In the improved suspension seat 87, the front end 36 of the bottom cushion pan 28 is not positively, pivotally connected to the upper end 37 of the vertical wall portion 24. Instead, a bearing 88, formed on the upper end 37 of the vertical wall portion 24, supports the front end 36 of the pan 28. More specifically, an arcuate surface 89 is formed on the upper end 37 of the wall portion 24 and a matching, complimentarily curved surface 91 is formed on the front end 36 of the pan 28. The bearing 88 permits pivotal, relative movement between the wall portion 24 and the pan 28 and as noted also provides vertical support for the front end 36 of the pan 28. The arcuate surface 89 of the bearing 88 has a sufficient radius of curvature so as to restrain fore and aft movement of the bottom cushion pan 28 and bottom cushion 34.

A third pair of identical links 92, interconnect the pan 28 and the first pair of links 29 and 31. Since both of the links 92 are connected and function in an identical manner, only one of the links is described in detail. The lower end 93 of the links 92 is pivotally connected at 94 to the link 29 midway between its ends 47 and 53. An upstanding, generally triangular, flange 95, is secured to the edge 38 of the pan 28 and the upper end 96 of the link 92 is pivotally connected to this flange 95 at 97. The links 92 provide additional support for the pan 28 and ensure that the pan 28 and thus the cushion 34, pivotally move up and down about an axis, indicated by the numeral 98, adjacent to the upper front edge of the cushion 34. The point of connection 97 between the link 92 and the flange 95 is in or above the horizontal plane including the axis 98.

Figure 7:
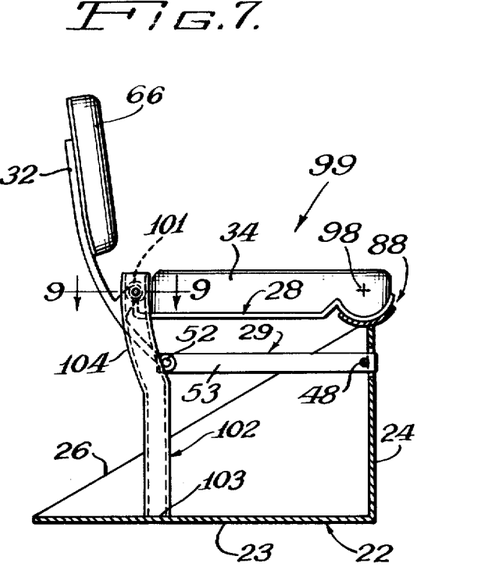

FIGURE 7 EMBODIMENT

Figure 9:
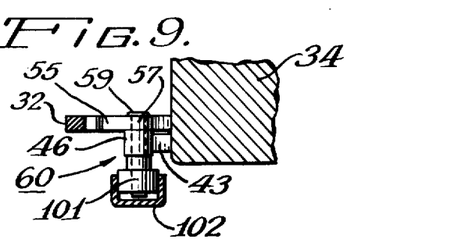
FIG. 9 is an enlarged, cross-sectional view taken on line 9—9 in FIG. 6.

The improved suspension seat 99 also utilizes a bearing 88 to support the front end 36 of the bottom cushion pan 28, rather than having the pan 28 being directly connected to the wall portion 24 by the hinge 34. However, instead of supporting the pan 28 by means of the links 92, the seat 99 utilizes rollers 101 and roller guides 102 for this purpose. As best shown in FIG. 9, the rollers 101 are mounted adjacent to the pivotal connections 61. More specifically, the rollers 101 are mounted on an extension of the pins 60. The guides 102 have a generally "U" shaped cross section, and are secured at their lower ends 103 to the base portion 23 of the seat support 22. The upper ends 104 of the guides 102 are curved, with the center curvature being located on the axis 98. The rollers 101 are disposed within the guides 102 for guided movement therein. The rollers and roller guides 101 and 102 are utilized to support the pan 28, to ensure that the pan, and thus the cushion 34, pivot up and down about the axis 98, and to restrain the pan 28 and thus the cushion 34 against fore-aft movement.

Figure 8:
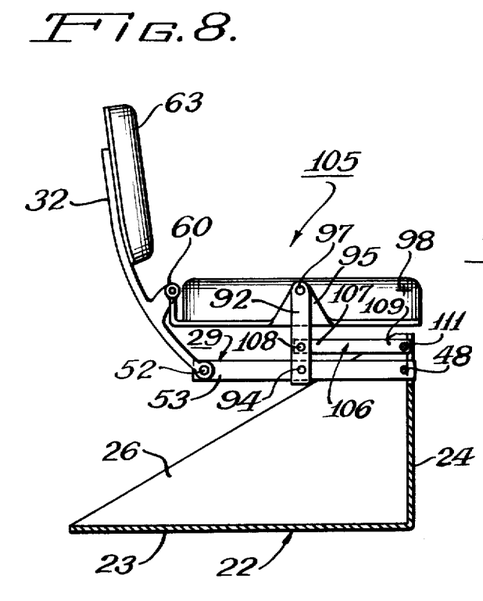

FIGURE 8 EMBODIMENT

The improved suspension seat 105 is generally structurally similar to the seat 87 except that the seat does not include a bearing 88 and the front end 36 of the pan 24 is not otherwise directly supported by the vertical wall portion 24. Instead another pair of identical links 106 are used to interconnect the links 92 and the vertical portion 24. Again since the links 106 are connected and function in an identical manner, only one of the links is described in detail. The rear end 107 of the link 106 is pivotally connected at 108 to the link 92, midway between its ends 93 and 96. The front end 109 of the link 106 is pivotally connected at 111 to the portion 24 in the same manner that the front end 47 of the link 29 is connected to the wall portion 24. The connection 111 is located above the connection 48. The use of the links 106 ensures that the cushion 34 is adequately supported and will pivot up and down about the axis 98 in the manner described above.

Figure 10:
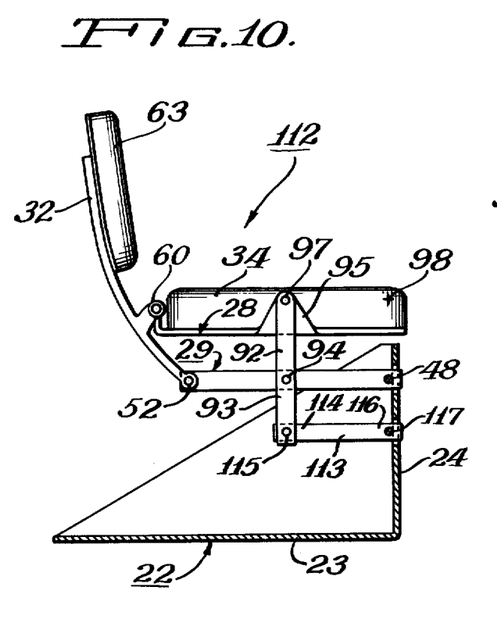
FIGS. 10 and 11 are partial, vertical, cross-sectional views of still other vehicle suspension seats embodying the present invention.

FIGURE 10 EMBODIMENT

The improved suspension seat 112 is structurally and functionally identical to the seat 105 except that another pair of identical links 113 are utilized, instead of links 106, to interconnect the links 92 and the verticall wall portion 24 of the seat support 22. As with the links 106, and for the same reason, only one of the links 113 is described in detail. The rear end 114 of the link 113 is pivotally connected at 115 to the extended lower end 93 of the link 92. The front end of the link 113 is pivotally connected at 117 to the vertical wall portion 24 in the same manner as the links 29 and 31 are connected to the wall portion 24.

Figure 11:
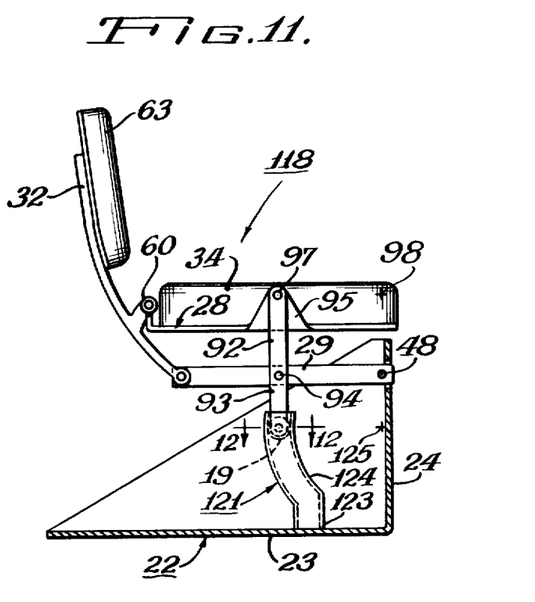

FIGURE 11 EMBODIMENT

Figure 12:
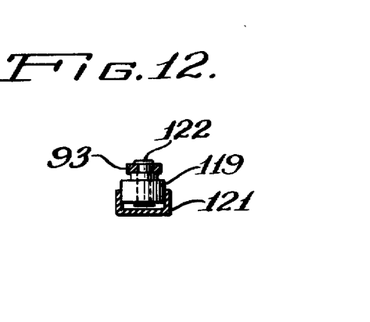
FIG. 12 is an enlarged, cross-sectional view taken on line 12—12 in FIG. 11.

The improved suspension seat 118 is structurally similar to the seats 105 and 112 except that rollers 119 and roller guides 121 are utilized in place of the links 106 and 113 respectively. As shown in FIG. 12, the rollers 119 are mounted, in a conventional manner, on the extended lower ends 93 of the links 92 by means of pins 122. Like the guides 102, the guides 121 have a generally "U" shaped cross section and are secured at their lower ends 123 to the base portion 23 of the seat support 22. Each of the upper ends 124 of the guides 121 is curved, with the center curvature being located at the point 125 where a line, perpendicular to the plane of the vertical wall portion 24, parallel to the plane of the base portion 23, and including the center of the rollers 119, intersects the wall portion 24. The rollers 119 are disposed within the guides 121 for guided movement therein. The rollers and roller guides 119 and 121 support the pan 28 and ensure that the cushion 34 pivots up and down about the axis 98 in the manner described above.

Figure 13:
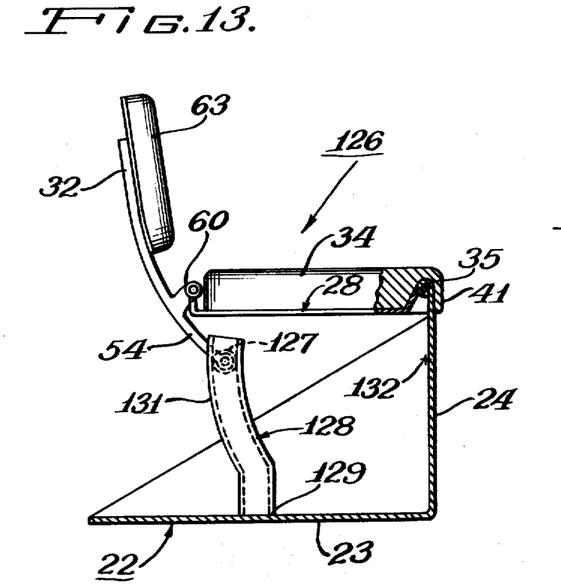
FIG. 13 is a partial, vertical, cross-sectional view of a further vehicle seat embodying the present invention.

FIGURE 13 EMBODIMENT

The improved suspension seat 126 is structurally similar to the seat 21 except that the rollers 127 and roller guides 128 are used instead of the links 29 and 31. The rollers 127 are mounted on the ends 54 of the links 32 and 33 in a manner similar to that used to mount the rollers 119 to the lower ends of the links 93. The roller guides 128 have a generally "U" shaped cross section and are secured at their lower ends 129 to the base portion 23 of the seat support 22. The rollers 127 are disposed within the upper portion 131 of the roller guides 128 for guided movement therein. The upper ends 131 of the guides 128 are curved, with the center of curvature of each of the ends 131 being located at a point 132 where a line, perpendicular to the wall portion 24, parallel to the plane of the base portion 23, and including the center of the rollers 127 intersects the wall portion 124. As a result of the curvature of the ends 131, the rollers 127 and guides 128 are able to support and guide the bottom cushion pan 28 in a manner functionally equivalent to the links 29 and 31 utilized in the seat 21.

FIGURE 14 EMBODIMENT

The improved suspension seat 134 is structurally similar to seat 21 except that the parallelogram linkage 27 is rearranged so that the length of the links 29 and 30 are substantially equal to the distance between the ends 36 and 44 of the bottom cushion pan 28 and so that the distance between the bearing 52 and the connection 60 is greater than the distance between the connection 48 and the hinge 35. It has been found that the foregoing arrangement of the parallelogram linkage 27 will provide a satisfactory minimization of the "feeling" of "pinching" so as to afford a relatively good quality of ride.

FIGURE 15 EMBODIMENT

The improved suspension seat 135 is structurally similar to seat 21, shown in FIGS. 1–4, except that the parallelogram linkage 27 is rearranged so that the distance between the bearing 52 and the connection 60 is greater than the distance between the connection 48 and the hinge 35. More specifically, it has been found that when the seat 135 is made such that the distance between the bearing 52 and the connection 60 is four and eleven sixteenths inches and the distance between the connection 48 and the hinge 35 is four inches (with the length of the bottom cushion pan 28, between the ends 36 and 44, being seventeen and three thirty-seconds inches and the length of the links 29 and 30 being fifteen inches), the "feeling" of pinching is satisfactorily minimized. Seats made like seat 135 have been successfully marketed and the quality of ride afforded by such seats has met with commerical acceptance.

CONCLUSION

In view of the foregoing, it is apparent that the invention described herein permits an improved vehicle seat to be designed which will provide a satisfactory, commerically acceptable quality of ride and which may be manufactured at a relatively low cost because of its simplicity. Furthermore, it should be obvious to those skilled in the art that other modifications could be made to the component parts of the seats or in their locations, e.g., the valve 81 could be mounted on the wall 25, described and that other accessory units, e.g., a fore-aft adjustment unit for the seat, could be utilized with the above described seats. Therefore, it should be clear that the invention described herein may be embodied in forms other than those specifically described herein without departing from the spirit or central characteristics of the invention. Thus the specific embodiments described above are thus to be considered in all respects as illustrative and not restrictive, the scope of the invention being indicated by the appended claims, rather than by the foregoing descriptions, and all changes that come within the meaning and range of equivalency of the claims are, therefore, intended to be embraced therein.

I claim:

1. An improved suspension seat for use with a vehicle which may be subjected to relatively severe bouncing and vibrations during its operation and which may include operator-controlled foot pedals, the improved seat comprising:

a seat support including a base portion adapted to be mounted on the vehicle and a vertical portion extending upwardly from the base portion;

a parallelogram linkage including: first and second, substantially identical, links spaced horizontally from each other, with each of the first and second links having a front end and a rear end and having their front ends pivotally connected to the vertical portion of the seat support at points spaced from each other and spaced equidistant from the base portion of the seat support; a bottom cushion pan having a front end, a rear end and side edges, with the bottom cushion pan being spaced from and vertically above the first and second links so that the front end of the bottom cushion pan generally overlies the front ends of the first and second links; a third and fourth, substantially identical, links, with each of the third and fourth links having a first end and a second end, with the first end of the third link being pivotally connected with the rear end of the first link and the first end of the fourth link being pivotally connected to the rear end of the second link, and with the third link being pivotally connected, at a point intermediate its ends, to the rear end of the bottom cushion pan, and adjacent to one side thereof, and the fourth link being pivotally connected at a point, intermediate its ends, to the rear end of the bottom cushion pan, and adjacent to the other side thereof;

a back cushion pan connected with and carried by and between the second ends of the third and fourth links;

a bottom cushion supported and carried by the bottom cushion pan, the bottom cushion having an inner surface which is disposed adjacent to the bottom cushion pan and an outer body contacting surface which is generally parallel to the inner surface but spaced therefrom, which is adapted to come in contact with the body of a person when the person is seated on the seat and which has a front edge adjacent to the front end of the bottom cushion pan;

a back cushion supported and carried by the back cushion pan, the back cushion having an inner surface which is disposed adjacent to the back cushion pan and an outer body contacting surface which is generally parallel to the inner surface but spaced therefrom and which is adapted to come into contact with the body of the person when the person is seated on the seat;

the parallelogram linkage, the back cushion and the bottom cushion being arranged so that the pivotal connections between the rear end of the bottom cushion pan and the third and fourth links are disposed adjacent to the intersection of the plane of the outer body contacting surface of the bottom cushion and the plane of the outer body contacting surface of the back cushion whereby the back cushion tends to pivot, with respect to the bottom cushion, about the hip joint of the person seated on the seat; the parallelogram linkage also being arranged, with respect to the vertical portion of seat support, so that the parallelogram linkage, and thus the bottom and back cushions pivot, with respect to the vertical, about the front edge of the upper body contacting surface of the bottom cushion whereby the front edge of the upper body contacting surface of the bottom cushion remains relatively stationary, with respect to the rest of the seat and with respect to the vertical, during operation of the vehicle so as to minimize the tendency of the person's feet from being lifted off the foot pedals of the vehicle during operation of the vehicle, the parallelogram linkage further being constructed so that the distance between the front and rear ends of the bottom cushion pan is greater than the length of the first and second links so as to minimize the change (decrease) in the included angle between the bottom cushion and the back cushion and thereby reduce pinching of the person during downward, vertical movement of the seat; and biasing means, extending between the base portion of the seat support and the parallelogram linkage, for biasing the parallelogram linkage away from the base portion of the seat support.

2. The improved seat described in claim 1 including damping means extending between the seat support and the parallelogram linkage, and thus the vertical oscillations of the bottom cushion, caused by the vibrations acting on the seat support.

3. The improved seat described in claim 2 wherein the damping means is a shock absorber having one end pivotally connected with the seat support and the other end connected with one of the first or second links; wherein the one of the first or second links has a slot formed therein, with the longitudinal axis of the slot being generally parallel to the longitudinal axis of the one of the first or second links; wherein the other end of the shock absorber is disposed within the slot and is movable within the slot between the ends of the slot; and wherein the other end of the shock absorber includes means for selectively permitting or preventing movement of the other end of the shock absorber with the slot, the last mentioned means being operable by the operator of the vehicle while the operator is seated on the seat and while the vehicle is being operated.

4. The improved seat described in claim 1 wherein the lengths of the first and second links are at least fourteen-seventeenths of the distance between the front and the rear ends of the bottom cushion pan.

5. The improved seat described in claim 1 including means for adjusting the vertical distance between the bottom cushion and the base portion of the seat support.

6. The improved seat described in claim 1 including means for providing a pivotal connection between the front end of the bottom cushion pan and the vertical portion of the seat support; and wherein the pivotal connection means is located above the plane of the first and second links and adjacent to the upper front edge of the upper, body contacting surface of the bottom cushion so as to minimize the feeling of "scrubbing" caused by fore-aft motion of the body contacting surface of the bottom cushion during movement of the seat, experienced by a person sitting on the seat.

7. The improved seat described in claim 1 wherein means for providing the pivotal connection between the front end of the bottom cushion pan and the vertical portion of the seat support is located adjacent to the longitudinal centerline of the bottom cushion and is of such a length, in a direction transverse to said centerline, that it is generally located between the legs of the person sitting in the seat.

8. The improved seat described in claim 7 wherein the means for providing the pivotal connection between the front end of the bottom cushion pan and the seat support portion of the seat mounting means is located generally within one and one-half inches of the upper surface of the bottom cushion; and wherein the distance between the front and rear ends of the bottom cushion pan is between seventeen and eighteen inches; wherein the length of the first and second links is at least fourteen inches; and wherein the vertical distance between the front ends of the first and second links and the front end of the bottom cushion pan is approximately four inches and the vertical distance between the rear ends of the first and second links and the rear end of the bottom cushion pan is between four and one-half and four and three-quarters inches.

9. The improved seat described in claim 7 wherein the seat includes damping means extending between the seat support and the parallelogram linkage for damping the vertical oscillations of the parallelogram linkage, and thus the vertical oscillations of the bottom cushion, caused by the vibrations acting on the seat support; wherein the damping means is a shock absorber having one end pivotally connected with the seat support and the other end connected with one of the first or second links; wherein the one of the first or second links has a slot formed therein, with the longitudinal axis of the slot being generally parallel to the longitudinal axis of the one of the first or second links; wherein the other end of the shock absorber is disposed within the slot and is movable within the slot between the ends of the slot; wherein the other end of the shock absorber includes means for selectively permitting or preventing movement of the other end of the shock absorber with the slot, the last mentioned means being operable by a person sitting on the seat; and wherein the biasing means is an air spring and includes means for adjusting the vertical distance between the bottom cushion and the base portion of the seat support portion of the seat mounting means and also the included angle between the bottom and back cushions, the adjusting means being operable by a person sitting on the seat.

10. The improved seat described in claim 1 wherein the parallelogram linkage includes fifth and sixth, substantially identical, links, with each of the fifth and sixth links having a first end and a second end; wherein the first end of the fifth link is pivotally connected with one side of the bottom cushion pan, intermediate the ends of the bottom cushion pan, and also is pivotally connected with the first link intermediate the ends of the first link; wherein the first end of the sixth link is pivotally connected with the other side of the bottom cushion pan, intermediate the ends of the bottom cushion pan, and also is pivotally connected with the second link, intermediate the ends of the second link.

11. The improved seat described in claim 10 wherein the upper end of the vertical portion of the seat support is disposed below the front end of the bottom cushion pan and includes a first bearing surface; and wherein the front end of bottom cushion pan has a second bearing surface formed thereon adjacent to the first bearing surface and arranged so that the second bearing surface engages and cooperates with the first bearing surface.

12. The improved seat described in claim 10 wherein the second end of the fifth link is pivotally connected to the first link, and wherein the second end of the sixth link is pivotally connected to the second link.

13. The improved seat described in claim 10 wherein the parallelogram linkage includes substantially identical seventh and eighth links, with each of the seventh and eighth links having a first end and a second end; wherein the first end of the seventh link is pivotally connected to the seat support portion of the seat mounting means and the second end of the seventh link is pivotally connected to the fifth link; and wherein the first end of the eighth link is pivotally connected to the seat support portion of the seat mounting means and the second end of the eighth link is pivotally connected to the sixth link.

14. The improved seat described in claim 13 wherein the second end of the seventh link is pivotally connected to the fifth link, intermediate the ends of the fifth link; and wherein the second end of the eighth link is pivotally connected to the sixth link, intermediate the ends of the sixth link.

15. The improved seat described in claim 14 wherein the second end of the fifth link is pivotally connected to the first link; and wherein the second end of the sixth link is pivotally connected to the second link.

16. The improved seat described in claim 10 wherein first and second roller guides are mounted on the base portion of the seat mounting means with the first roller guide being generally vertically aligned with the fifth link and with the second roller guide being generally vertically aligned with the sixth link; wherein a first roller is mounted on the second end of the fifth link and is disposed within the first roller guide for guided movement therein; and wherein a second roller is mounted on the second end of the sixth link and is disposed within the second roller guide for guide movement therein.

17. The improved seat described in claim 10 wherein the upper end of the vertical portion of the seat support is disposed below the front end of the bottom cushion pan and includes a first bearing surface; wherein the front end of the bottom cushion pan has a second bearing surface formed thereon adjacent to the first bearing surface and arranged so that the second bearing surface engages and cooperates with the first bearing surface; wherein first and second roller guides are mounted on the base portion of the seat mounting means; wherein a first roller is mounted on the bottom cushion pan adjacent to the connection between the bottom cushion pan and the third link and is disposed in the first roller guide for guided movement therein; and wherein a second roller is mounted on the bottom cushion pan adjacent to the connection between the bottom cushion pan and the fourth link and is disposed in the second roller guide for guided movement therein.

* * * * *